US012347300B1

(12) United States Patent
Gilbert et al.

(10) Patent No.: US 12,347,300 B1
(45) Date of Patent: Jul. 1, 2025

(54) SMOKE DETECTOR DEVICE UTILIZING NETWORK COMMUNICATION PROTOCOL COEXISTENCE TECHNIQUES

(71) Applicant: Amazon Technologies, Inc., Seattle, WA (US)

(72) Inventors: Marcus-Alan Gilbert, Plano, TX (US); Gilles-Arnaud Bleu-Laine, San Ramon, CA (US); Christopher Ganster, Villanova, PA (US); Radhakrishnan Suryanarayanan, Fremont, CA (US); Vinay Sagar Krishnamurthy Vijaya Shankar, San Jose, CA (US); Muhammad Sharifuzzaman Khan, Sunnyvale, CA (US); Arvind Kandhalu Raghu, Frisco, TX (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 18/342,465

(22) Filed: Jun. 27, 2023

(51) Int. Cl.
*G08B 25/10* (2006.01)
*G08B 17/10* (2006.01)

(52) U.S. Cl.
CPC ............. *G08B 25/10* (2013.01); *G08B 17/10* (2013.01)

(58) Field of Classification Search
CPC ................................ G08B 25/10; G08B 17/10
See application file for complete search history.

(56) References Cited

U.S. PATENT DOCUMENTS 5,671,361 A * 9/1997 Brown ................... G06Q 10/06 705/7.23
7,193,644 B2 3/2007 Carter
7,978,050 B2 * 7/2011 Moshfeghi .............. H04W 8/04 340/10.2
8,139,098 B2 3/2012 Carter
8,144,183 B2 3/2012 Carter
8,154,581 B2 4/2012 Carter
8,780,201 B1 7/2014 Scalisi et al.
8,823,795 B1 9/2014 Scalisi et al.
8,842,180 B1 9/2014 Kasmir et al.
8,872,915 B1 10/2014 Scalisi et al.
8,937,659 B1 1/2015 Scalisi et al.
8,941,736 B1 1/2015 Scalisi
(Continued)

*Primary Examiner* — John A Tweel, Jr.
(74) *Attorney, Agent, or Firm* — Eversheds Sutherland (US) LLP

(57) ABSTRACT

This disclosure describes techniques for operating multiple communication protocols on a single channel. In embodiments, such techniques may involve determining multiple communication activities to be performed using a wireless transceiver, retrieving priority information associated with the multiple communication activities to be performed, and determining, based on the priority information, a priority level for individual communication activities of the multiple communication activities. Once such a priority level has been determined, the techniques may further involve identifying a prioritized communication activity of the multiple communication activities having the highest priority level and establishing a wireless communication session between the electronic device and a station associated with the prioritized communication activity using a communication protocol associated with the prioritized communication activity.

20 Claims, 9 Drawing Sheets

(56) References Cited

U.S. PATENT DOCUMENTS

| | | | |
|---|---|---|---|
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 9,838,537 B2 * | 12/2017 | Ristock | H04M 3/5233 |
| 10,587,302 B2 * | 3/2020 | Medapalli | G10L 15/30 |
| 11,031,011 B2 * | 6/2021 | Park | G06F 3/167 |

* cited by examiner

SMOKE DETECTOR DEVICE UTILIZING NETWORK COMMUNICATION PROTOCOL COEXISTENCE TECHNIQUES

BACKGROUND

Smoke detector and CO detector devices are ubiquitous. Traditionally, these devices were very simple, with the only alert being a loud sound alerting building occupants to a hazardous condition. More recently, detector devices have started to be able to communicate electronically, with alert messages potentially being communicated to other devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
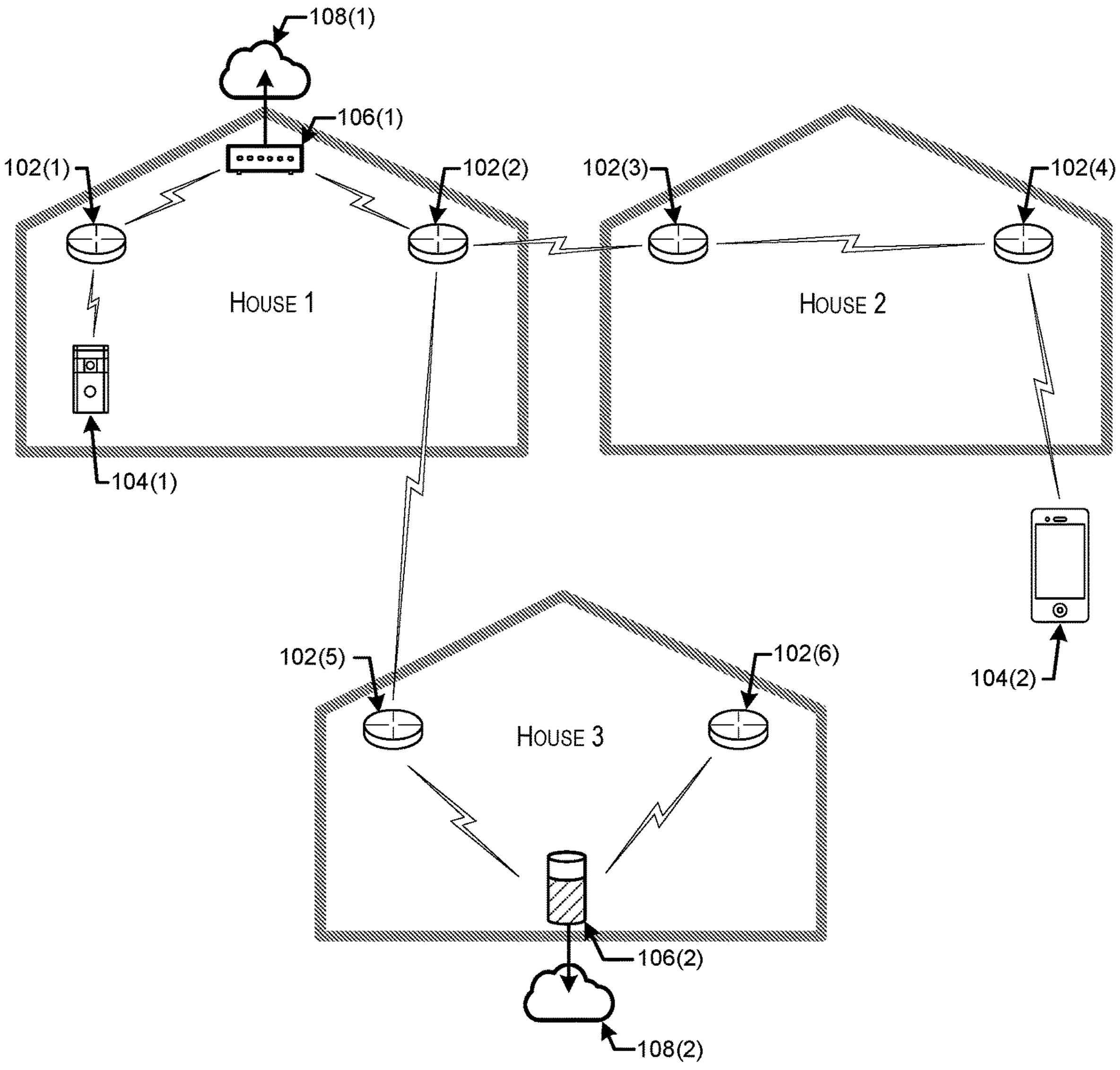
FIG. 1 depicts an example environment in which a system may be implemented to enable a device to communicate using multiple communication protocols via a single transceiver in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

This disclosure describes, in part, smoke and CO detector devices that utilize one or more sub-gigahertz (sub-GHz) transceivers (or transmitters and receivers) for communications using one or more protocols, including one or more protocols facilitating long range, low data rate communications with distant devices and/or higher data rate communication with other nearby devices.

For example, a detector device may be configured to utilize a low power network that supports both a first sub-GHz protocol using a frequency shift keying (FSK) modulation scheme and a second sub-GHz protocol using a chirp spread spectrum modulation scheme (e.g., LoRa). Such a detector device may, for example, utilize the first protocol for FSK communications with a nearby Internet-connected device to enable over-the-air (OTA) updates, and utilize the second protocol for longer range LoRa communications with a more distant Internet-connected device (e.g., in the event of a local network outage). Such a detector device may also utilize a third sub-GHz protocol for communications with other smoke and CO detector devices, e.g., communications related to operation as a smoke and CO detector device.

In accordance with one or more preferred implementations, a detector device utilizes a single radio for communications using three different sub-GHz protocols and utilizes a timing architecture to accomplish such radio sharing. In accordance with one or more preferred implementations, this timing architecture provides priority to alarm events, and can also provide priority for network maintenance, e.g., providing priority to a third beacon after two have been missed.

In accordance with one or more preferred implementations, a detector device also includes a microphone and software/firmware for detecting a wake-word and sending captured audio to a back-end for transcription and processing (e.g., by a virtual assistant system). The device can provide responses using a speaker.

In accordance with one or more preferred implementations, a detector device also provides access point or router functionality, e.g., operates as a WiFi access point or router.

In accordance with one or more preferred implementations, techniques enable a device (e.g., a gateway device or end node device) to communicate using multiple different communication protocols and using a single radio transceiver (e.g., a 900 MHz radio transceiver). In embodiments, the techniques enable communications between a gateway device and end node devices while maximizing the types of end node devices that can operate on the network and while minimizing power consumption.

In embodiments, the gateway device and the end node devices communicate using one of a number of sub-gigahertz (GHz) communication protocols with low bandwidth. For example, the gateway device and the end node devices may communicate using a low-bandwidth sub-GHz communication protocol to register the end node device with the gateway device and/or to transmit command and control (C&C) signals (e.g., transmit management frames and/or control frames from the gateway device to the end node devices).

In a device in which operations for multiple different communication protocols are performed using a single radio transceiver, each of those communication protocols may contend for the use of the radio transceiver. In such cases, the device may manage activities of the various communication protocols based on a priority associated with each of the respective activities. In such cases, when multiple activities associated with different communication protocols are scheduled to occur at the same time, the access to the channel may be provided for the activity having the highest determined priority. In such cases, activities with a lower priority are preempted and might be reattempted at a later time.

Priorities for the activities to be performed may be retrieved via a lookup within a global priority table that is provisioned onto each of the devices (which may be gateway devices and/or end node devices) in the network. In such cases, the global priority table may maintain a list of priorities associated with each of a number of activities that might be performed by various available communication protocols. In some cases, such priorities may be assigned based on information provided by a developer of an application. Priorities might be adjusted in some cases upon detecting that certain conditions have occurred.

In some embodiments, a gateway device or end node device may be implemented within or as part of a common household electronic device that performs a primary function that is unrelated to communication. For example, a gateway device or end node device may be implemented within a smoke/carbon monoxide detector. Such smoke/carbon monoxide detectors may be installed throughout a house or other region by a user, providing both coverage of smoke and carbon monoxide detection as well as network coverage. Information about alarm events that is generated by the smoke/CO detector may be conveyed to other devices on the WLAN and provided an urgent priority.

In accordance with one or more preferred implementations, a gateway device is implemented as a smoke detector device providing ionization-type smoke detector functionality, photoelectric-type smoke detector functionality, or dual smoke detector functionality (i.e., both ionization-type and photoelectric-type).

In accordance with one or more preferred implementations, a smoke detector device comprises a chamber including radioactive material disposed between two electrically charged metal plates, which ionizes the air, causing current to flow between the plates. If smoke enters the chamber, it disrupts the flow of ions, thus reducing the flow of current. This reduction in current is sensed, and triggers a smoke alarm.

In accordance with one or more preferred implementations, a smoke detector device comprises a chamber including a light sensor, and a light source emitting light into the chamber at an angle away from the light sensor. If smoke enters the chamber, it causes light to be reflected onto the light sensor. The light sensor then triggers a smoke alarm.

In accordance with one or more preferred implementations, a gateway device is implemented as a carbon monoxide (CO) detector device.

In accordance with one or more preferred implementations, a CO detector device comprises a gas-permeable compartment comprising electrochemical sensors composed of electrodes submerged in an electrolyte. If carbon monoxide enters the compartment, a chemical reaction causes electrical current passing through the electrolyte to surge. A concentration of carbon monoxide is determined based on an amount of current increase.

In accordance with one or more preferred implementations, a CO detector device comprises a metal oxide carbon monoxide sensor.

In accordance with one or more preferred implementations, a CO detector device comprises a light sensor and a gel that changes color as it absorbs carbon monoxide. The light sensor monitors the gel's color, which indicates a level of carbon monoxide.

Embodiments of the disclosure provide for a number of advantages over conventional systems. For example, by allowing multiple communications protocols to use a single radio transceiver, embodiments of the disclosure allow for a more diverse range of devices to be connected together. Devices that may typically only be capable of short-range communication are able to leverage the long-range communication capabilities available to a WLAN network without any substantial increase in battery consumption by those devices.

FIG. 1 depicts an example environment in which a system may be implemented to enable a device to communicate using multiple communication protocols via a single transceiver in accordance with at least some embodiments. FIG. 1 illustrates an exemplary network implemented across a geographic region. More particularly, the network is depicted as being implemented across a number of houses (e.g., House 1-3). Such a network may include a number of detector devices 102 (1-6) operating as an end node and/or gateway device as well as one or more other devices 104 (1-2) distributed throughout the geographic region that may be operating as an end node and/or gateway for the network. The detector devices 102 may also be operating as a node in another network, as may additional other devices. Additionally, the network may further include one or more router devices 106 that provide egress/ingress for (e.g., access into, or out of), the network. For example, a router device 106 may provide connectivity between the network and another network 108 (1-2), such as the Internet.

In some embodiments, the detector device 102 may operate using a number of different communication protocols. In order to implement multiple communication protocols via a single transceiver, the detector device 102 may maintain one or more stacks (e.g., queues) of radio frequency (RF) commands (e.g., activities) to be executed, where each of the stacks are associated with a different communication protocol. Activities may be assigned a priority level when added to a stack. An activity may comprise, for example, an RF command representing a listen command (e.g., a check event) or a transmission command (e.g., a transmit event). An activity may be, for example, a transmit beacon activity, or a listen for beacon activity.

In some embodiments, a detector device 102 may be a smoke/carbon monoxide (CO) detector that is to be installed within a house or other suitable structure. In such embodiments, the detector device may further include one or more sensors configured to collect data. In some cases, the detector device 102 may be configured to trigger an alarm event upon detecting certain conditions (e.g., upon detecting smoke/CO, etc.).

A detector device may be configured to operate as a node device or end node device for one or more networks. In some cases, an end node device is a wireless sensor node equipped with one or more sensors, computing hardware, radio transceivers, and power components. The individual end node devices in the network (e.g., a wireless sensor network (WSN)) may be inherently resource-constrained, in that they may have limited processing speed, storage capacity, and communication bandwidth. The end node devices 102 may communicate among themselves or with the gateway device 108 using radio signals.

An end node device might include an Internet of Things (IoT) device configured to perform an operation based on instructions provided remotely (e.g., from a mobile application) by receiving those instructions via the detector device 102. Some nonlimiting examples of an end node device 104 include a pet locating devices, sensors (e.g., motion sensors, smoke detectors), automation devices (e.g., lights, door locks, smart appliances), a mobile device (such as a mobile phone connected to the network 108), or an audio/video recording and communication device (A/V device) such as a video doorbell.

Other devices 104 may communicate with detector devices 102 using any suitable protocol. By way of non-limiting example, such communications may be Amazon Sidewalk SubG (referred to as SubG-FSK), LoRa® radio (referred to as SubG-CSS), or Bluetooth® Low Energy (referred to as BLE). In general, other devices 104 and detector devices 102 communicate using frames. Frames can carry commands to control the connection, and/or data to communicate with a backend server. End node devices that are not actively communicating with a gateway device can enter a low power mode. In such cases, Power Profiles stored on the end node device 104 may be used to manage low power behavior in order to reduce battery consumption.

It should be noted that some electronic devices may perform as both a detector device 102 and an end node device 104.

A router device 208 may include any suitable electronic device configured to provide ingress/egress to the network 204 (e.g., a gateway). In some embodiments, the router device 208 enables communication between devices in the network 204 and devices outside the network 204 (e.g., via a second network). An example of router device 208 may include a router, routing switch, integrated access device, multiplexer, or any other suitable device. While depicted as being separate from a detector device 102, it should be noted that a router device 208 may also function as a detector device 102.

Each of the detector devices 102 may include the hardware and functionality to communicate with various types of end node devices, as well as communicate over an external network 108. For example, the detector devices 102 may have the hardware and functionality to communicate with servers over the network 108 by communicating with a WiFi network within a home (e.g., connected to router device 106), and the detector devices 102 may also have the hardware and functionality to communicate with the other devices 104 over a different wireless protocol, such as a 900 megahertz (MHz) band of channels. Some of the other devices 104 may not be capable of communicating directly over the WiFi network, so their communications would pass through a respective detector device 102 or gateway device.

In various embodiments, other wireless protocols may be used for the network devices (e.g., detector devices 102 and other devices 104) to communicate over the network and/or with one another. In various embodiments, such network devices may also communicate with one another (or with an external network 108) over wired connections, such as through an Ethernet cable connecting one or more of the network devices to a wired or wireless router device 106 in connection with the network 108. The network devices may also communicate over a combination of wired and wireless network components. In various embodiments, other wireless protocols and/or wired connections may also be used for communication between the various network devices. In embodiments, the network devices may communicate with one another using the same wireless protocol (e.g., a 900 MHz band of channels). In some embodiments, the network devices may communicate using a variety of different communication protocols. Exemplary wireless or wired communication protocols that may also be used in various embodiments include, for example and without limitation, X10, RS-485, 6LoWPAN, Low Power Time Synchronized Network (LPTSN), Bluetooth LE (BLE), ZigBee, Z-Wave, and/or a low power wide-area networks (LPWAN), such as a chirp spread spectrum (CSS) modulation technology (e.g. LoRa) or network protocol (e.g., LoRaWAN), an Ultra Narrow Band modulation technology network (e.g., Sigfox, Telensa, NB-IoT, etc.), RingNet, and/or the like.

Accordingly, in various embodiments, the network may include any wireless network, any wired network, or a combination thereof, configured to operatively couple the modules, devices, components, and/or systems as illustrated in FIG. 1. For example, the network may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34 is analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
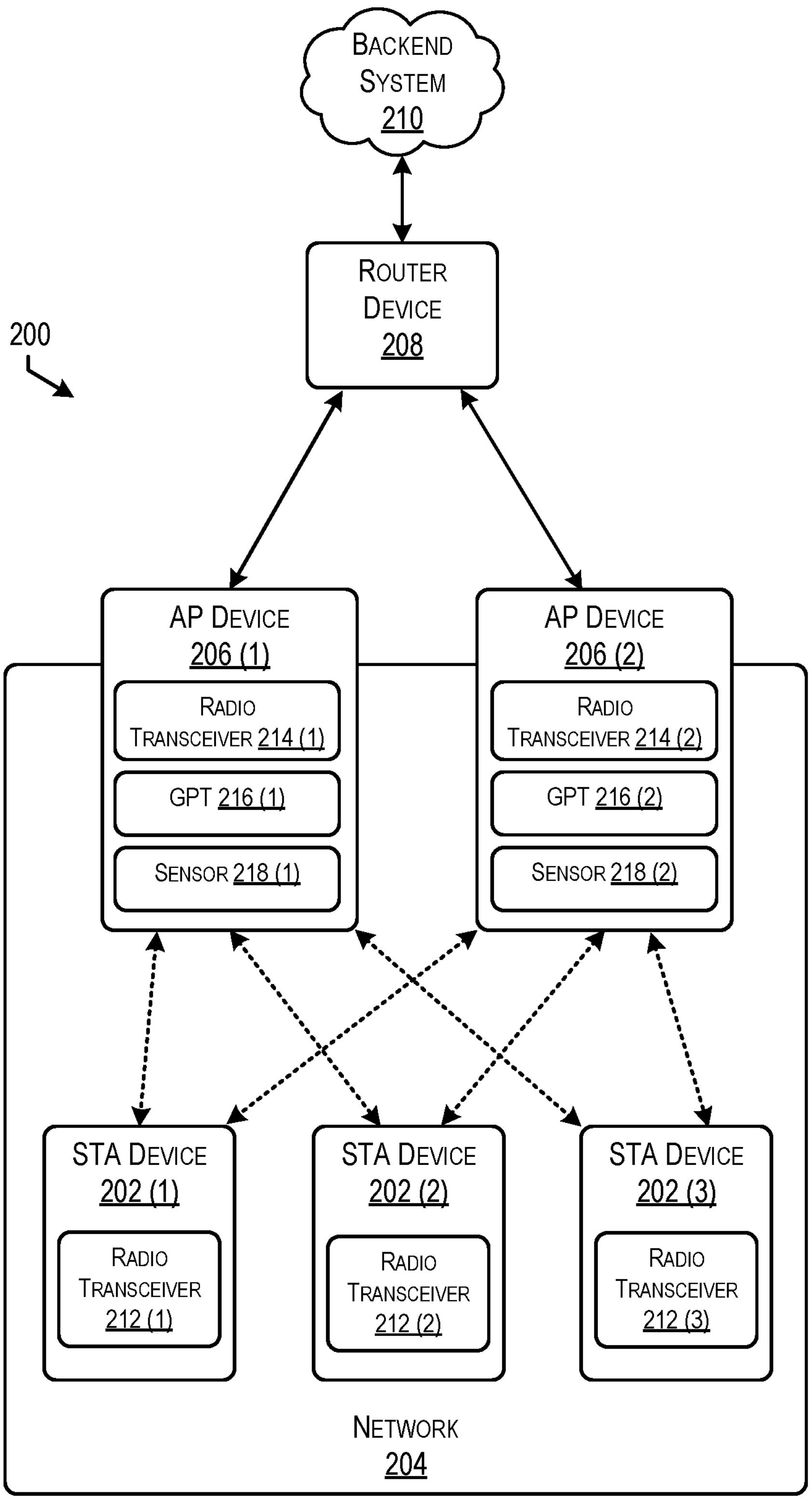
FIG. 2 depicts an example environment in which a system may be implemented to use a single radio transceiver to communicate using multiple communication protocols in accordance with at least some embodiments.

FIG. 2 depicts an example environment in which a system may be implemented to use a single radio transceiver to communicate using multiple communication protocols in accordance with at least some embodiments. An exemplary system as depicted with respect to environment 200 may include a number of end node devices 202 (1-3) included in a network 204. The network 204 may further include a number of access point (AP) devices 206 that enables communication between the various components within the network 204 as well as with a router device 208 that provides access to one or more electronic devices outside of the network 204, such as a backend system 210. It should be noted that the network 204 may include multiple end node devices 202 and gateway devices 206. It should be noted that end node devices 202, gateway devices 206, and router device 208 may be examples of the other devices 104, detector devices 102, and router device 106 as described in relation to FIG. 1 above.

As noted elsewhere, an end node device 202 may be any electronic device configured to communicate with other devices on the network 204. Each of the end node devices 202 (1-3) may include at least a respective radio transceiver 212 (1-3). The radio transceiver 212 may be configured to both transmit and receive communications between the respective end node device 202 and another electronic device. The end node device 202 may include medium access control (MAC) module or interface. An end node device 202 may include a physical layer module or interface for radio media, and the term "end node device" may, in its definition, include both an AP and a non-AP STA (station). In some cases, a single device might function as a gateway device 206 in one transaction and an end node device 202 in another.

The network 204 may include any suitable local network of devices. In some embodiments, such a network 204 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. As noted above, the network 204 may include a wireless sensor network (WSN). In embodiments, the network 204 may be configured as a low-power (LP) version of a network type, such as a low power wide area network (LPWAN). The devices in the network 204 might operate in either synchronous or asynchronous mode.

As noted elsewhere, a gateway device 206 may include any electronic device that facilitates communication between the various components in the network 204. In embodiments, the gateway device 206 is a device that allows the management (control) of the network 204 and aggregates the information received from the end node devices 202 to send real-time, or near real-time, data to a router device 208. The gateway device 206 may include one or more processors and a memory that stores computer executable instructions for implementing at least a portion of the functionality described herein.

Each of the gateway devices 206 (1-2) may include at least a respective radio transceiver 214 (1-2). The radio transceiver 214 may be configured to both transmit and receive communications between the respective gateway device 206 and another electronic device (e.g., a end node device 202 or router device 208).

Additionally, each of the gateway devices 206 may include (in a respective memory) a global priority table (GPT) 216 that defines the relative priorities of stacks (e.g., transmission stacks), assigning a priority value for all combinations of each stack activity and priority levels. In some embodiments, the GPT 216 may include multiple arrays, each of which define the priority values for a respective stack. In some embodiments, the GPT 216 may include parameters such as a stack activity (e.g., a transmission type), a priority level (e.g., normal, high, or urgent), and a weight (e.g., a multiplier used for granular priority control). There may be different priority level classifications and those priority level classifications may vary dynamically based on various factors. For example, an activity that is typically classified as having a normal priority may be given an urgent priority under certain circumstances. By way of illustration, a beacon reception activity may typically be given a normal priority in the GPT 216 but may be assigned an urgent priority if a beacon reception activity is repeatedly missed. In some cases, a weight parameter might provide for granular priority control that is specific to the context of the activity and can be used by an application. For instance, a transmit of an alarm message could be treated differently from a transmit of status reporting message by a single application by adjusting the relative weight of each of the activities in the GPT 216. When a radio frequency (RF) command is scheduled for a stack, the stack activity priority level is provided as schedule parameters. The stack activity priority level can then be used to perform a lookup into the GPT 216 to find the corresponding GPT value for the scheduled RF command.

In embodiments, the gateway device 206 is configured to send and/or receive periodic transmissions to and/or from one or more of the end node devices 202. Each of the end node devices 202 may operate in a sleep mode for some predetermined amount of time (e.g., a sleep interval). In some cases, the amount of time that each end node device 202 spends in the sleep mode may be a default amount of time as set by a manufacturer or distributor of the end node device 202. In some embodiments, the amount of time that each end node device 202 spends in the sleep mode may be determined by the gateway device 206. In these embodiments, the gateway device 206 may provide instructions to each end node device 202 to set a sleep interval of the length of time as determined by the gateway device 206. The gateway device 206 may be configured to identify the sleep intervals associated with each of the end node devices 202 and may schedule periodic transmission times (e.g., transmit events) to occur during wake intervals (e.g., check events) for the end node devices 202.

The backend system 210 may be any suitable computing device or combination of computing devices configured to manage information collected via the end node devices 202 as described herein. In some embodiments, the backend system 210 is configured to provide instructions to one or more of the end node devices 202 via a gateway device 206. In embodiments, the backend system 210 is configured to interact with a user device or other remotely located electronic device (e.g., via an application installed upon, and executed from, the user device).

In embodiments in which the backend system 210 uses a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Figure 3:
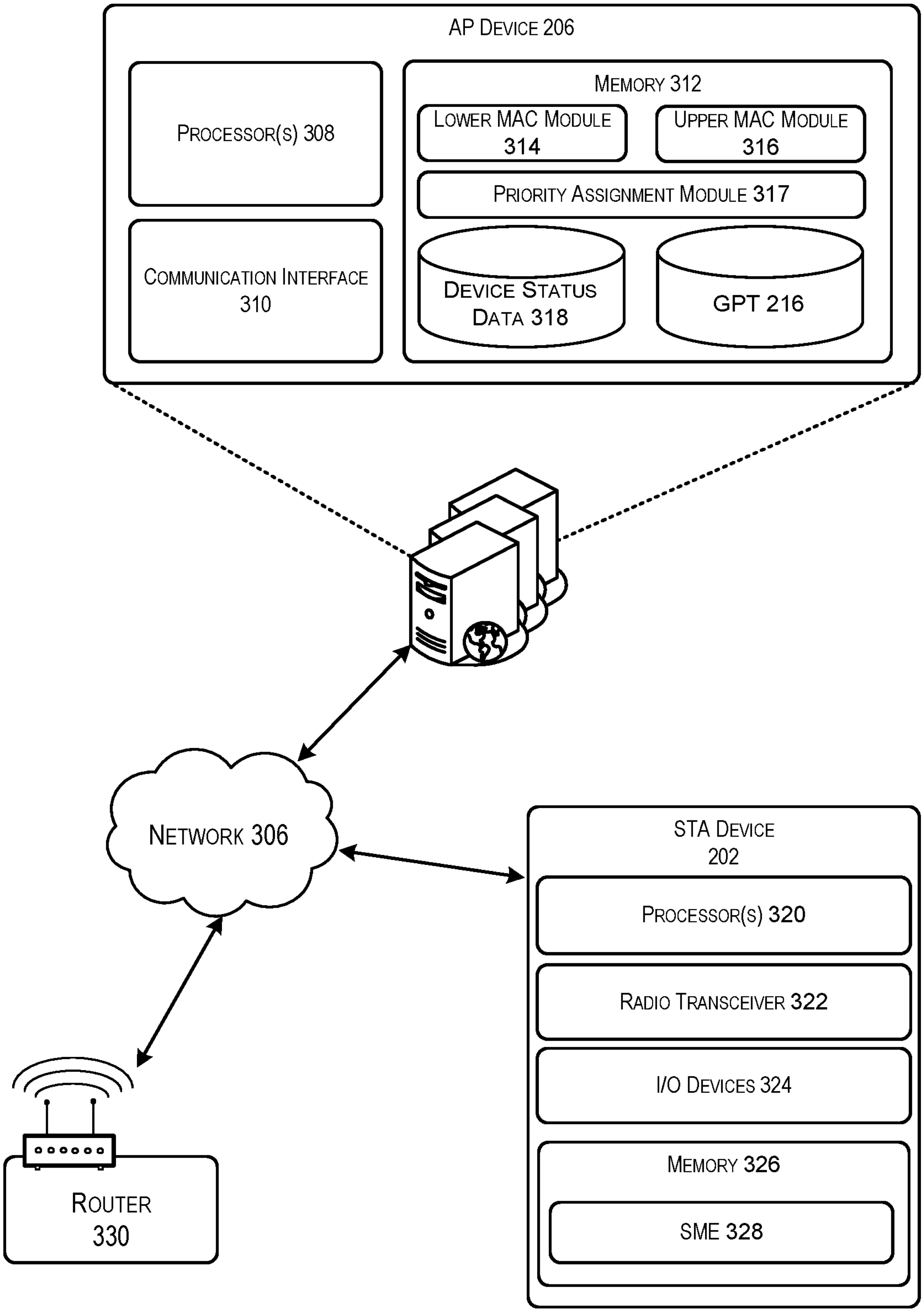
FIG. 3 depicts a system architecture that may be implemented to use communication techniques in which multiple communication protocols use a single transceiver in accordance with at least some embodiments.

FIG. 3 depicts a system architecture that may be implemented to use communication techniques in which multiple communication protocols use a single transceiver in accordance with at least some embodiments. As shown in FIG. 2, a gateway device 206 may be in communication with at least one end node device 202 via a network 306. The gateway device 206 and end node device 202 may be examples of the respective gateway device 206 and end node device 202 as described in relation to FIG. 2 above.

As noted above, the gateway device 206 may include any computing device configured to manage communications between a backend system and the end node devices 202 using communication techniques as described herein. As depicted, the gateway device 206 may include a number of hardware components, such as one or more processors 308, a communication interface 310, and a memory 312.

As used herein, a processor 308 may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The communication interface 310 may be any component configured to enable data to be communicated between electronic devices. The communication interface 310 may include one or more network interface controllers (NICs) or other types of transceiver devices to send and receive messages over network(s). For instance, the communication interface 310 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (Wi-Fi), or any other PAN message protocol. Furthermore, the communication interface 310 may include a wide area network (WAN) component to enable message over a wide area network.

Memory 312 may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information, and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information, and which can be accessed by the processor(s) 308.

Further, functional components may be stored in the memory, or the same functionality may alternatively be implemented in hardware, firmware, application specific integrated circuits, field programmable gate arrays, or as a system on a chip (SoC). In addition, while not illustrated, the memory may include at least one operating system (OS) component that is configured to manage hardware resource devices such as the communication interface 310, the I/O devices of the respective apparatuses, and so forth, and provide various services to applications or components executing on the processor(s) 308. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (ENEA OSE) as promulgated by ENEA AB of Sweden; and so forth.

Turning to the contents of the memory 312 in more detail, the memory 312 may include an operating system and one or more application programs or services for implementing the features disclosed herein including a lower MAC module 314, an upper MAC module 316, an activity or priority assignment module 317, device status data 318, and a global priority table 216. The lower MAC module 314 may be a component of a MAC layer of the gateway device 206 that interacts with a physical layer of the gateway device 206. For example, the lower MAC module 314 may be configured to generate data frames corresponding to various communication protocols. In some cases, the lower MAC module 314 may be configured to generate Wi-Fi packets, low-bandwidth sub-GHz protocol frames (e.g., LFR frames), high-bandwidth sub-GHz protocol frames (e.g., frames corresponding to a protocol with a 900 MHz bandwidth), and/or the like.

In some cases, the lower MAC module 314 performs operations related to MAC protocol data unit transmissions and acknowledgement. In some cases, the lower MAC module 314 controls access to the connection medium associated with the gateway device 206.

The upper MAC module 316 may be a component of the MAC layer of the gateway device 206 that interacts with a logical link control layer of the gateway device 206. For example, the upper MAC module 316 may be configured to associate the gateway device 206 with a set of end node devices 202.

An activity assignment module 317 may be configured to, in conjunction with the processor 308, determine a priority to be assigned to each of multiple activities scheduled to use a radio transceiver within a time slot. To do this, when multiple activities are scheduled at substantially the same time, the activity assignment module 317 may retrieve priority information from the GPT 216 that is used to make a priority determination for each of the respective activities. Once a priority has been determined for each of the multiple activities, an activity having the highest priority is granted access to the radio transceiver at the scheduled time and the other activities are rescheduled.

In embodiments, information about activities scheduled in relation to various communication protocols may be maintained in a stack. A separate stack of activities may be maintained with respect to each of separate communication protocols. As noted elsewhere, the GPT 216 may maintain information about a priority for a particular combination of stack and activity type. Each stack may be associated with a priority based on the respective communication protocol. Additionally, each activity within a stack may be assigned a separate priority based on the type of activity. The priority for a particular activity may be determined as a function of the stack priority as well as the priority associated with the activity type.

The gateway device may maintain information about statistics and/or characteristics associated with each of a number of types of end node devices (e.g., device status data 318). For example, information about particular end node devices may be provided by a manufacturer or seller of the end node device. Such information may include an indication of average or expected data values to be exhibited by such end node devices. For example, the information may include average maximum clock drift characteristics for the end node device, described in units of parts per million (PPM) that may be used to determine an accuracy of the clock included in a particular end node device. In such cases, the information may include an indication of an average PPM offset related to a crystal oscillator included in the end node device at room temperature. In some cases, an indication may be stored as to whether the device uses a TCXO compensation circuit to compensate for internal drift based on temperature variations.

In some cases, characteristic information may be provided by the end node device itself. For example, when the end node device 202 is provisioned onto the network 306, it may provide information about clock drift or other suitable characteristics. In another example, the end node device 202 may provide synchronization signals on a periodic basis. The timing of such synchronization signals may be compared against expected timing to determine an accuracy of the clock in the end node device 202.

Additionally, as noted above, the gateway device 206 may include a global priority table (GPT) 216 that defines the relative priorities of stacks, assigning a priority value for all combinations of each stack activity and priority levels. In some embodiments, the GPT 216 may include multiple arrays, each of which define the priority values for a respective stack. In some embodiments, the GPT 216 may include parameters such as a stack activity, a priority level, and a weight.

As noted above, the end node device 202 may be any electronic device configured to communicate with other devices on a network 306. As depicted, the end node device 202 may include a number of hardware components, such as one or more processors 320, a radio transceiver 322, one or more input/output devices 324, and a memory 326.

Similar to that of the gateway device 206, the processor 308 may include multiple processors and/or a processor having multiple cores. Likewise, memory 326 may include volatile and nonvolatile memory, removable and non-removable media implemented in any method or technology for storage of information.

A radio transceiver 322 may include any suitable combination of transmitter and receiver circuitry. In some embodiments, the radio transceiver 322 may be included in a network interface card included within the end node device 202. In some cases, the radio transceiver may be external to the end node device 202, in that it may be separate from the end node device 202 but coupled to the end node device 202 via a physical connection.

An input device of the I/O devices 324 may be any component configured to enable a user to provide input to the end node device. Such an input device may include, but is not limited to, a button, a touch-sensitive surface, a switch, a slider, and/or any other type of device that allows a user to provide input to the end node device 202.

An output device of the I/O devices 324 may be any component capable of providing an output signal to a user. In some cases, an output device may comprise one or more lights that are powered up to provide an output signal to a user. In some cases, an output device may be a speaker capable of producing sound in response to an electrical signal input.

Turning to the contents of the memory 326 in more detail, the memory 326 may include an operating system and one or more application programs or services for implementing the features disclosed herein including a station management entity (SME) 328 configured to manage operations of the end node device 202, and at least a module for adjusting a length of a sleep interval to be implemented by the end node device 202 (e.g., a sleep interval adjustment module).

The operation of a end node device in a WLAN system may be described in relation to a layer structure configured by the processor 320 in terms of a device configuration. The end node device 202 may include a plurality of layer structures. For example, the 802.11 standards relate to at least a MAC sublayer on a data link layer (DDL) and a physical (PHY) layer. The PHY may include a physical layer convergence procedure (PLCP) entity and a physical medium dependent (PMD) layer. The MAC sublayer and the PHY layer conceptually include management entities respectively called an MAC sublayer management entity (MLME) and a physical layer management entity (PLME). These entities provide a layer management service interface in which a layer management function works.

To provide an accurate MAC operation, a SME 328 may be present in each end node device 202. The SME 328 is a layer-independent entity that is present in a separate management plane or can be seen to be off to the side. Although accurate functions of the SME 328 are not illustrated in detail in this disclosure, the SME 328 may generally function to collect a layer-dependent state from various layer management entities (LMEs) and to similarly set the values of layer-specific parameters. Generally, the SME 328 may perform these functions on behalf of a general system management entity and may implement a standard management protocol.

In some embodiments, the gateway device 206 may further be in communication with a router device 330. Such a router device 306 may include hardware and/or software components that enable communication between the gateway device 206 and one or more electronic devices located outside of the network 306.

Figure 4:
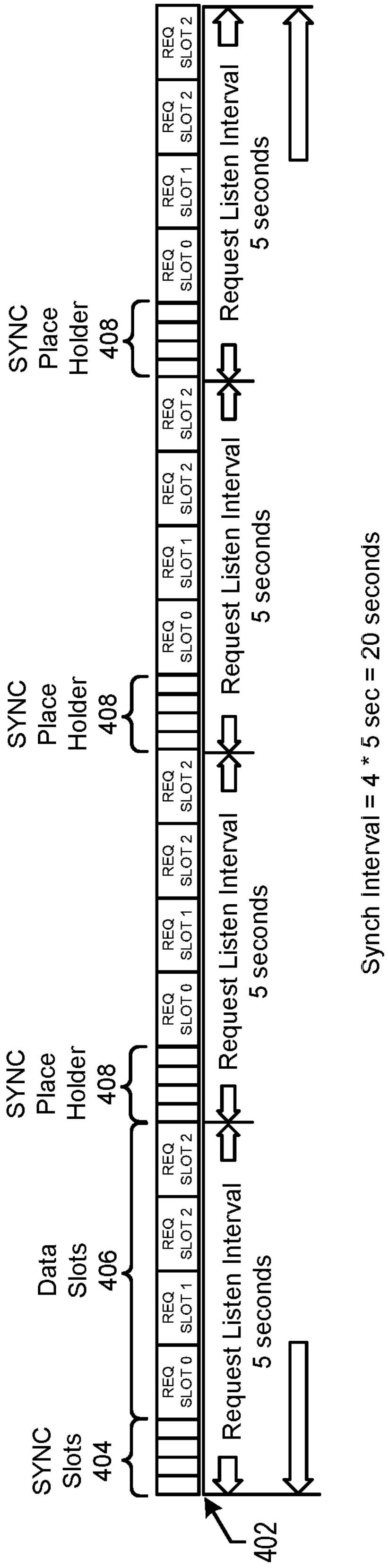
FIG. 4 depicts a conceptual view illustrating a typical timeline used in operation of a communication protocol in accordance with at least some embodiments.

FIG. 4 depicts a conceptual view illustrating a typical timeline used in operation of a communication protocol in accordance with at least some embodiments. By way of nonlimiting example, the timeline 402 depicted in FIG. 4 may represent operations associated with a Low Power Time Synchronized Network (LPTSN) protocol that may be used to establish communication between one or more devices.

In some cases, particular protocols may include operations that have a tight timeline. In these cases, operations for the protocol must be performed as frequently (e.g., as close together) as possible in order to avoid disassociation from clock drift. By way of example, LPTSN operations may require a rate of operations with close to +/−60 us maximum jitter in time synchronization across the network. This must continue to be maintained irrespective of operations for other communication protocols. This can be problematic in cases in which other communication protocols are attempting to perform operations using the same radio transceiver as it reduces the opportunities for those other communication protocol operations to be performed.

By way of illustration, LPTSN frames might be of a predetermined length with time synch messaging happening in each of the frames or every $n^{th}$ frame. In these cases, a maximum time interval between synch messages can be up to 250 seconds in order to ensure that critical events, such as alarm messages, can continue to have very low latency (e.g., 10 second end-to-end) as if operated in an architecture using a single communication protocol.

In an example in which the communication protocol is an LPTSN protocol, there may be a repeating time frame called a Request Listen Interval which contains synchronization slots 404 used for time synchronization across the network and data slots 406 used for communication. Note that the synch slots 402 may also be used for over-the-air updates or any control information dissemination. The actual time synchronization info may occur typically only every 4 time frames, with sync placeholders 408 being positioned in the other time frames. Note that the duration of an exemplary time frame might be 3.7 s or 5 seconds. A size of the synch slot 404 may depend on a listening interval duration, a number of devices in the network and the size of a synchronization communication period.

In embodiments, the communication model is of a request-response type. Each gateway device listens for commands in its assigned time slot for a short duration in order to check for activity. If no activity is detected, then the gateway device will go back to sleep.

Figure 5:
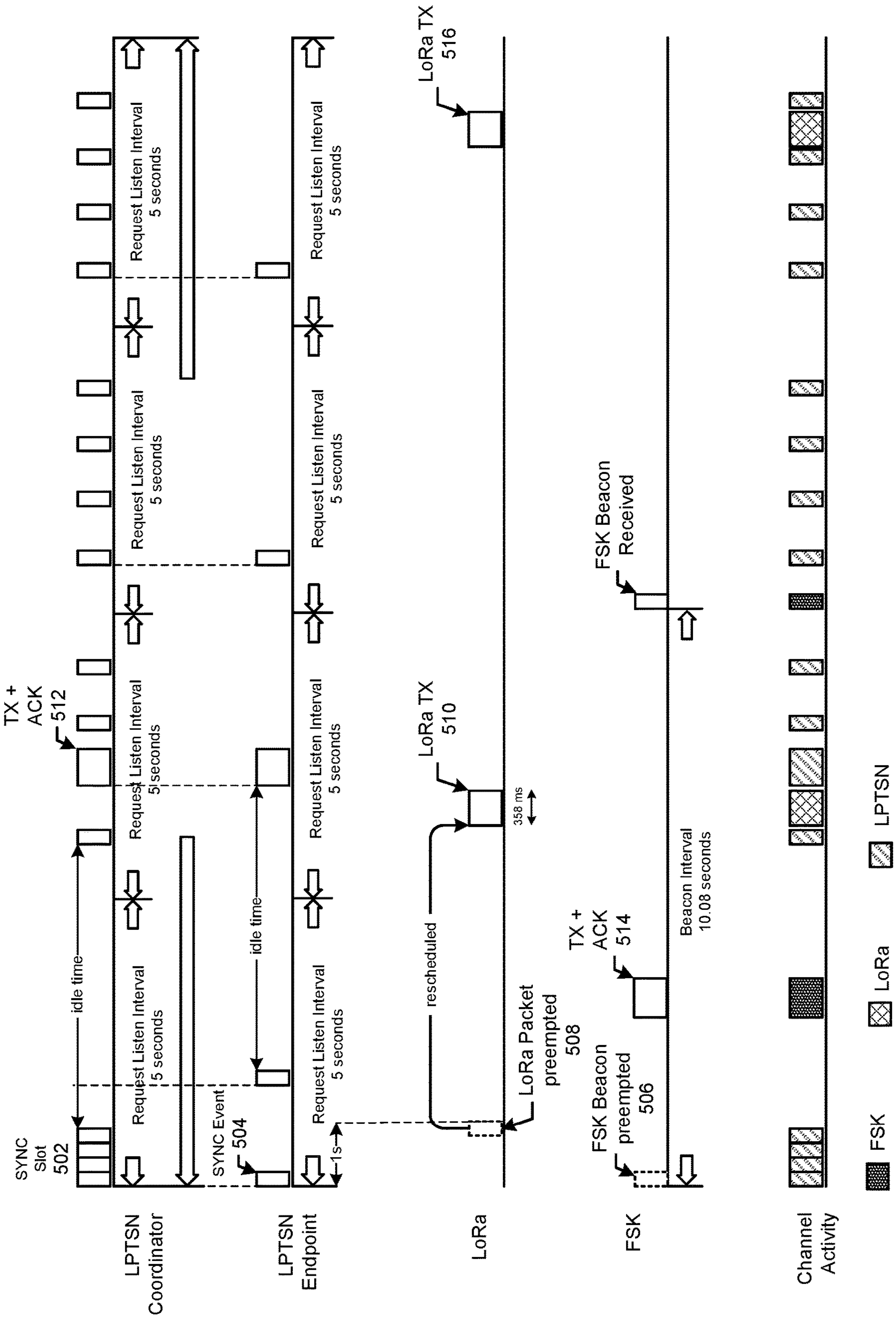
FIG. 5 depicts a conceptual view illustrating an example timeline in which operations for multiple communication protocols may be performed using a single channel in accordance with at least some embodiments.

FIG. 5 depicts a conceptual view illustrating an example timeline in which operations for multiple communication protocols may be performed using a single channel in accordance with at least some embodiments. More particularly, FIG. 5 depicts a number of activities both preempted and performed in relation to the multiple communication protocols. For illustrative purposes, a number of such activities are illustrated along separate timelines for each of a Low Power Time Synchronized Network (LPTSN) coordinator, Long Range (LoRa) protocol, and a Frequency-shift keying (FSK) protocol. Additionally, a timeline is illustrated for a LPTSN endpoint representing a detector device operating using a LPTSN protocol. Finally, a timeline is depicted that illustrates aggregated activity for the channel.

In the illustrated timelines, consider that the LPTSN protocol has the highest priority of the communication protocols using the channel. Accordingly, activities associated with the LPTSN protocol will be prioritized in this example. By way of illustration, a synchronization event 504 may be scheduled to occur on the LPTSN protocol. Additionally, an FSK Beacon 506 that is scheduled to occur at the same time as a synchronization event 504 may be preempted and (because of its lower priority as determined from the GPT) may not occur. Since this is a beacon activity, it would not need to be rescheduled.

Additionally, an activity associated with the LoRa protocol that is scheduled to occur within a synchronization slot for the LPTSN protocol may be rescheduled to a later time (e.g., 510). In some embodiments, the activity may be rescheduled using a backoff procedure. In such a procedure, the device may determine the size of a contention window (CW) using a random backoff algorithm and perform a backoff procedure. The device may select a random value within the CW to perform the backoff procedure and determine backoff time based on the selected random value.

In embodiments, a number of additional uncontested activities may be performed using various protocols. For example, activities 512, 514, and 516 may be performed as scheduled without requiring prioritization. In embodiments, each of the transactions may include a transmission/reception as well as an acknowledgement. In embodiments, a determination can be made as to whether all of the data associated with the activity has been received by the receiving device based on the acknowledgement. For example, such an acknowledgement may include an indication of an amount and/or type of data conveyed via the activity. The receiving entity may compare the actual data received in the activity with that expected based on the information included in the acknowledgment.

Figure 6:
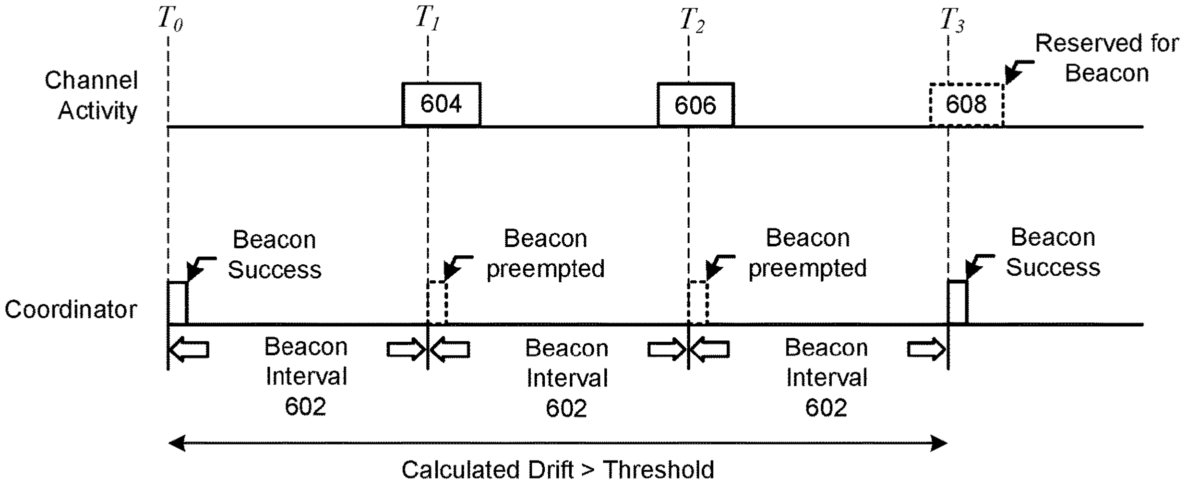
FIG. 6 depicts a conceptual view illustrating a timeline in which an activity can be reprioritized dynamically in accordance with at least some embodiments.

FIG. 6 depicts a conceptual view illustrating a timeline in which an activity can be reprioritized dynamically in accordance with at least some embodiments. As noted elsewhere, a priority can be maintained for each activity within a GPT, such as GPT 216 described in relation to FIG. 2 above. Additionally, a GPT may dynamically adjust a priority of a given activity if certain conditions occur.

In an IEEE 802.11 compliant wireless local area network (WLAN), activities typically involve transmitting and/or receiving frames between an end node device and a gateway device. There are generally three types of frames: management frames, control frames, and data frames. Management frames are used to manage a basic service set (BSS), control frames control access to the medium (e.g., radio channel), and data frames contain payloads that convey information to a recipient.

One type of management frame is a beacon frame. A beacon frame serves to announce the presence of a wireless network broadcast by a gateway device and synchronize members of the network. Other types of networks commonly use beacon frames or beacon messages as well.

A beacon frame includes a service set identifier (SSID) field that indicates an SSID of the wireless network corresponding to the beacon frame. A beacon frame may further include capability information, a frequency hopping parameter set, and a traffic indication map (TIM).

A beacon frame includes a timestamp field that indicates a time that the beacon frame was transmitted. This field is utilized by an end node device receiving the beacon frame to synchronize its clock to the gateway device's clock.

A beacon frame further includes a beacon interval field. The beacon interval field indicates a beacon interval defining how often a beacon frame is transmitted for the wireless network. For example, this may be 100 time units (TU), which might correspond to around 102.4 milliseconds.

During operation, a time synchronization mechanism may be used to time wake intervals during which a device is configured to receive information as well as to time the transmission of information to that device. This time synchronization mechanism may rely on local oscillator hardware that provides time reference for either the gateway device and/or the end node device, even in sleep mode. These oscillators may have certain drift due to various factors such as aging, temperature variation, capacitor load imbalance, etc. This drift in the oscillators can result in mismatched timing between a gateway device and an end node device.

For example, an end node device may be configured to wake up to receive beacons for a wireless network it is connected to. The end node device may determine a sleep or wake period based on the beacon interval defined in a beacon interval field of a received beacon frame for the wireless network. An end node device may be configured to wake up for every beacon frame that is transmitted for a wireless network or be configured to only wake up for a subset of transmitted beacon frames, e.g., for every third beacon frame. Clock drift at the end node device may cause the end node device's wake period to not be aligned with a transmitted beacon frame. This could be more common if a client device is configured not to wake for every transmitted beacon frame, as the more time that passes in between received beacon frames, the greater the clock differential caused by any clock drift. If the differential grows large enough (e.g., greater than a threshold differential value), then the end node device may miss future beacons. Multiple beacon misses may cause the device to initiate a disassociation and reassociation, which translates to a loss of connectivity and potential impact on customer experience, such as an inability to access video on demand from a camera device or a device showing as offline.

In FIG. 6, a beacon activity is depicted as being reprioritized in order to prevent a disassociation. A beacon activity may be an activity to either transmit or receive a beacon. As noted above, the beacon activity may be associated with a beacon interval 602 that represents a time interval between each beacon activity.

As depicted the beacon activity may be successful at a time $T_0$. However, the beacon activity may be preempted at time $T_1$ by another activity 604 and at time $T_2$ by yet another activity 606. In some embodiments, the GPT may be adjusted so that the beacon activity is assigned a higher priority each time that the beacon is preempted. In some embodiments, the beacon activity may be given a higher priority upon a specified number of beacon activities (e.g., two, three, etc.) having been preempted. In some of those embodiments, the specified number of beacon activities to be preempted before being prioritized may be determined based upon a clock drift associated with a device intended to receive the beacon. For example, a calculation may be made, based on the length of the beacon interval, as to the total number of beacon activities that may be missed before the total clock drift would be so great that future beacons would continue to be missed. In some embodiments, the GPT may assign an urgent priority to the beacon activity until a successful completion of the beacon activity, at which point the GPT may reset the priority of the beacon activity to its previous priority level.

In some embodiments, the channel may be reserved for the beacon activity. For example, upon a beacon being missed at times $T_1$ and $T_2$, a channel reservation 608 may be set at or before a time $T_3$ at which another beacon activity is scheduled to occur.

Figure 7:
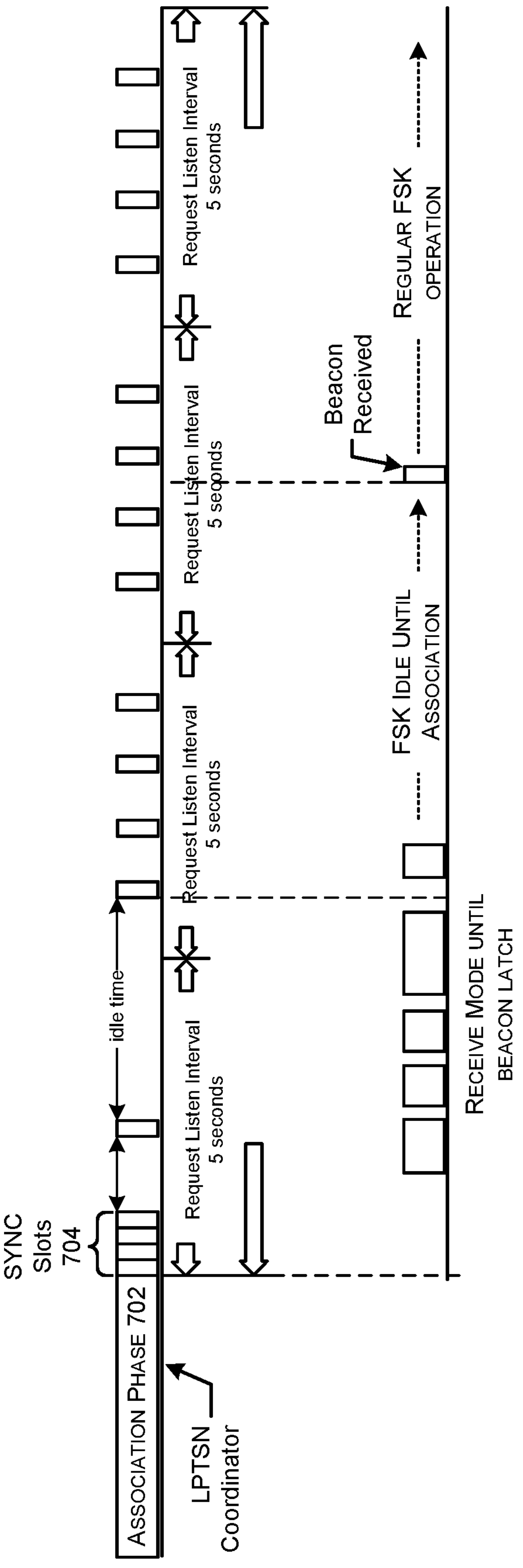
FIG. 7 depicts a conceptual view illustrating a timeline for enabling enrollment of multiple communication protocols for operation on a single channel in accordance with at least some embodiments.

FIG. 7 depicts is a conceptual view illustrating a timeline for enabling enrollment of multiple communication protocols for operation on a single channel in accordance with at least some embodiments. It should be noted that enrollment of a communication protocol for use with a channel may require extensive use of the channel. Accordingly, enrollment of a particular communication protocol may require that activities by other communication protocols be temporarily suspended on the channel during that enrollment.

By way of illustration, consider a scenario in which a gateway device is to be enrolled for use with both LPTSN and FSK communication protocols. In such a scenario, the communication protocol to be enrolled first might be determined based on a priority associated with each of the respective communication protocols. For illustrative purposes, consider that the LPTSN protocol is assigned a higher priority than the FSK protocol. Accordingly, in this scenario the gateway device may be enrolled with the LPTSN protocol prior to being enrolled with the FSK protocol.

In an illustrative scenario, the gateway device enters an association phase 702 during which the gateway device is associated with one or more other devices that use the LPTSN protocol. In this scenario, synchronization slots 704 occur after the association phase in order to synchronize the clock of the gateway device and one or more end node devices.

Once the enrollment of the LPTSN has been completed, an enrollment of the FSK protocol is initiated. In such an enrollment process, the gateway device may be put into receive mode until a beacon is successfully latched. In embodiments, the LPTSN coordinator may be placed into idle mode while the FSK is attempting to latch a beacon. Upon latching an initial beacon, the gateway device may determine a schedule for future beacons. Upon receiving a beacon in accordance with the beacon schedule, the gateway device may initiate regular FSK operation. Note that once regular FSK operation has been initiated (e.g., FSK enrollment is complete), the channel may perform operations associated with both of the LPTSN protocol and the FSK protocol.

Figure 8:
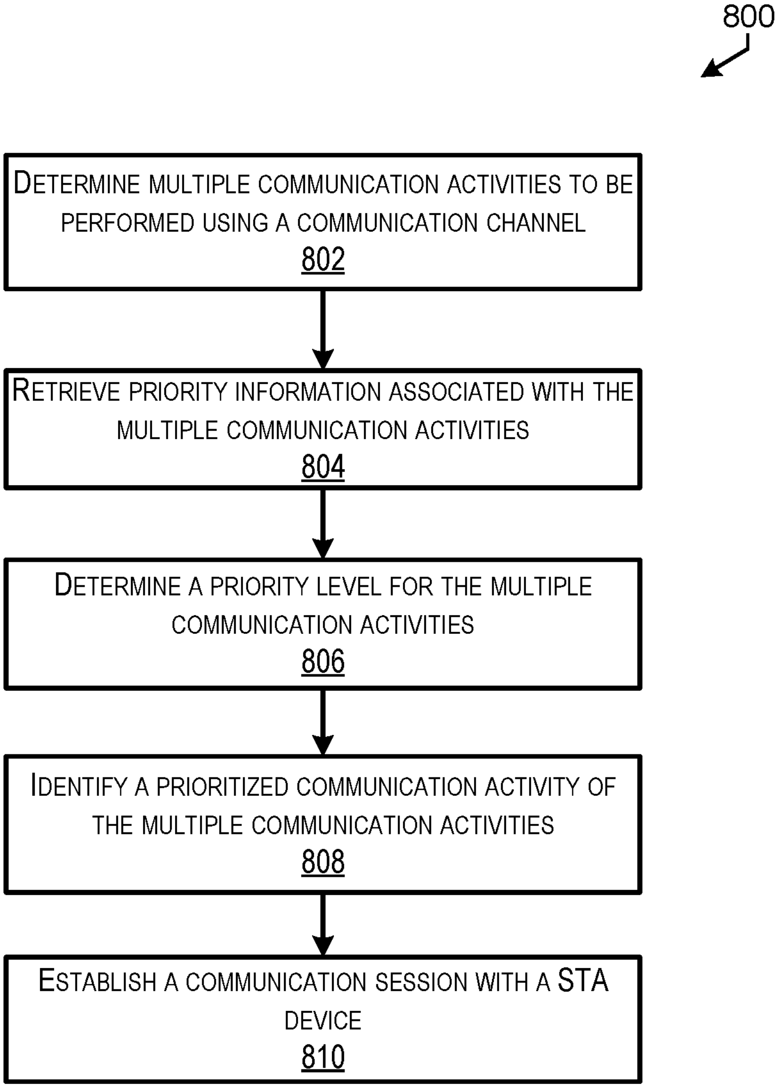
FIG. 8 depicts a flow diagram illustrating a process for reserving a channel using a series of beacon transmissions in accordance with at least some embodiments.

FIG. 8 depicts a flow diagram illustrating a process for providing for use of a channel by multiple communication protocols in accordance with at least some embodiments. While the process 800 is depicted as a series of blocks, it should be noted that the steps described in relation to process 800 may be performed in any suitable order. The process 800 may be performed between devices within a network, such as an access point (AP) device within a network. For example, the process 800 may be performed by the detector device 102 as described in relation to FIG. 1 above.

As noted elsewhere, a detector device may include any suitable electronic device capable of performing the functions described herein. The detector device may include a wireless transceiver that is used to communicate with other electronic devices within a network. In some embodiments, the detector device may further include one or more sensors configured to obtain information unrelated to communication activities. For example, the detector device may be a smoke or carbon monoxide detector that includes one or more sensors such as smoke sensors or carbon monoxide sensors.

At 802, the process 800 may involve determining multiple communication activities to be performed using the wireless transceiver. In embodiments, the multiple communication activities may be activities involving transmitting and/or receiving data packets over the wireless transceiver. The multiple communication activities may be associated with multiple different communication protocols.

At 804, the process 800 may involve retrieving priority information associated with the multiple communication activities to be performed. In some embodiments, the priority information associated with the multiple communication activities to be performed is retrieved from a global priority table. Such a global priority table may include information about priorities assigned to particular combinations of activity type and communication protocol.

In some embodiments, priority information included in a global priority table may be updated dynamically as one or more conditions are met. For example, in some cases a priority for a beacon activity may be increased upon determining that the beacon activity has failed (e.g., has been preempted) for some threshold number of times. In another example, a priority for a beacon activity may be increased each time that the beacon activity fails until it either succeeds (in which case it may be reset to its previous priority) or it is assigned the highest priority level available.

At 806, the process 800 may involve determining, based on the priority information, a priority level for individual communication activities of the multiple communication activities. In some embodiments, the priority level is determined based at least in part on a communication protocol associated with individual communication activities of the multiple communication activities. In some embodiments, the priority level is determined based at least in part on an activity type associated with individual communication activities of the multiple communication activities. In some embodiments, the priority level is determined based on a combination of the communication protocol and the activity type associated with individual communication activities of the multiple communication activities.

At 808, the process 800 may involve identifying a prioritized communication activity of the multiple communication activities having the highest priority level. A prioritized communication activity may be a transmission to be sent over the communication channel.

At 810, the process 800 may involve establishing a wireless communication session between the electronic device and a station associated with the prioritized communication activity using a communication protocol associated with the prioritized communication activity. In some embodiments, the communication protocol associated with the prioritized communication activity comprises one of a Low Power Time Synchronized Network (LPTSN) protocol, Long Range (LoRa) protocol, or a Frequency-shift keying (FSK) protocol. In some embodiments, at least one of the multiple communication activities other than the prioritized communication activity may be rescheduled to a later time.

In accordance with one or more preferred implementations, an electronic detector device operating as a smoke or CO detector is further configured to receive voice input and provide audio output. The electronic detector device may be configured for use with a remote system providing digital assistant functionality.

Figure 9:
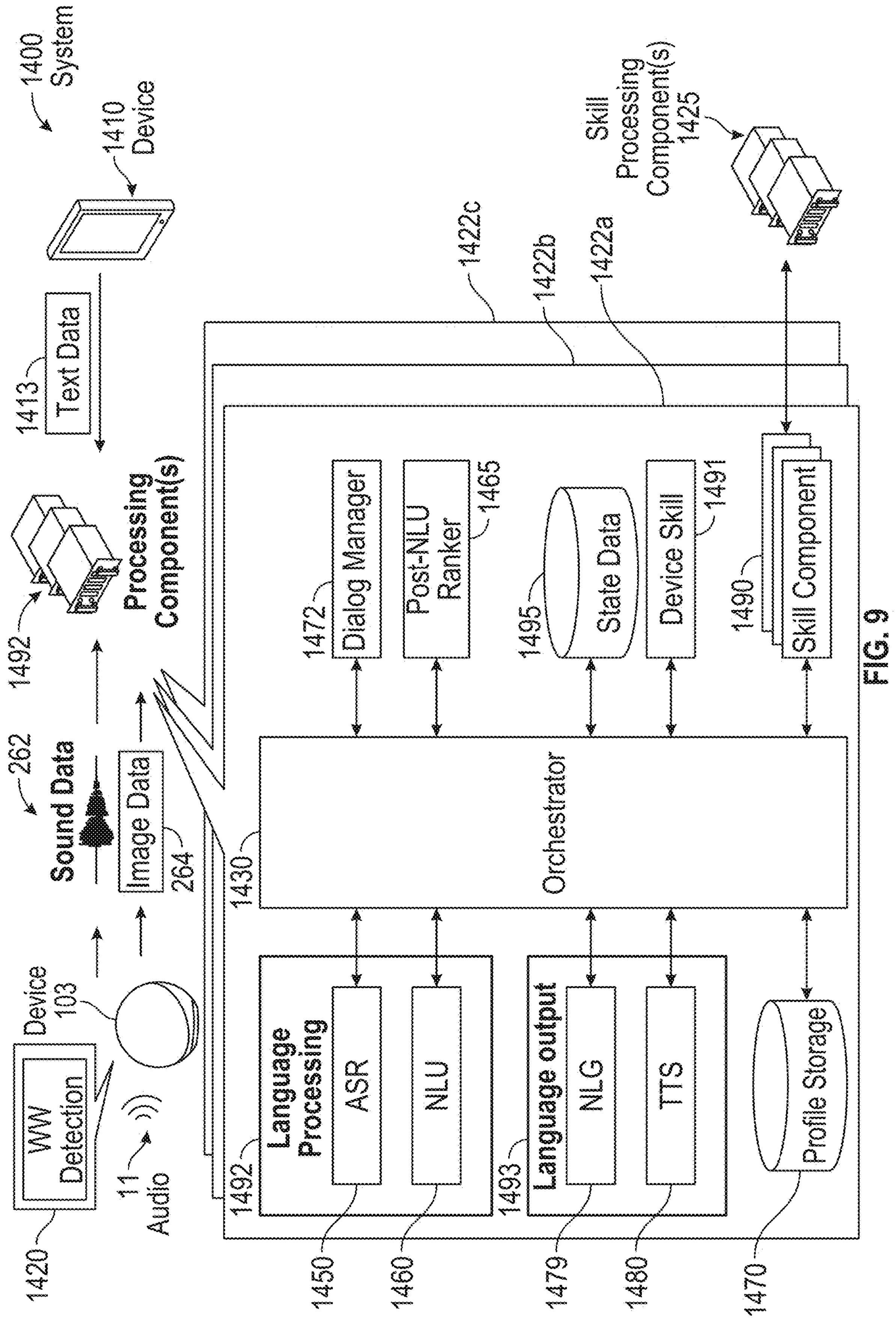
FIG. 9 is a block diagram of a system configured to operate in conjunction with a device, according to some implementations.

FIG. 9 is a block diagram of a system 1400 configured to operate in conjunction with a device 103 (which may be substantially similar to a device 102 described herein, except in that it is additionally configured for voice and audio functionality), according to some implementations. The various components of the system 1400 may be located on same or different physical devices. Communication between various components may occur directly or across a network(s). The device 103 may include audio capture component(s), such as a microphone or array of microphones of the device 103, captures audio 11 and creates corresponding audio data. Once speech is detected in audio data representing the audio 11, the device 103 may determine if the speech is directed at the device 103 or the system 1400. In at least some embodiments, such determination may be made using a wakeword detection component 1420. The wakeword detection component 1420 may be configured to detect various wakewords. In at least some examples, a wakeword may correspond to a name of a different digital assistant. An example wakeword or digital assistant name is "Alexa." In another example, input to the system may be in form of text data 1413, for example as a result of a user typing an input into a user interface of device 103. Other input forms may include indication that the user has pressed a physical or virtual button on device 103, the user has made a gesture, etc. The device 103 may also capture images using camera(s) of the device 103 and may send image data 264 representing those image(s) to the system 1400. The image data 264 may include raw image data or image data processed by the device 103 before sending to the system 1400.

The wakeword detector 1420 of the device 103 may process the audio data, representing the audio 11, to determine whether speech is represented therein. The device 103 may use various techniques to determine whether the audio data includes speech. In some examples, the device 103 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 103 may implement a classifier configured to distinguish speech from background noise. The classifier may be implemented by techniques such as linear classifiers, support vector machines, and decision trees. In still other examples, the device 103 may apply hidden Markov model (IMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection may be performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 1420 and/or input is detected by an input detector, the device 103 may "wake" and begin transmitting sound data 262, representing the audio 11, to the system(s) 1400. The sound data 262 may include data corresponding to the wakeword; in other embodiments, the portion of the audio corresponding to the wakeword is removed by the device 103 prior to sending the sound data 262 to the system(s) 1400. In the case of touch input detection or gesture-based input detection, the audio data may not include a wakeword.

In some implementations, the system 1400 may include more than one system 1400. The systems 1400 may respond to different wakewords and/or perform different categories of tasks. A system 1400 may be associated with its own wakeword such that speaking a certain wakeword results in audio data be sent to and processed by a particular system. For example, detection of the wakeword "Alexa" by the wakeword detector 1420 may result in sending audio data to system 1422*a* for processing while detection of the wakeword "Galadriel" by the wakeword detector may result in sending audio data to system 1422*b* for processing. The system may have a separate wakeword and system for different skills/systems (e.g., "Game Master" for a game play skill/system 1422*c*) and/or such skills/systems may be coordinated by one or more skill component(s) 1490 of one or more systems 1422.

Upon receipt by the system(s) 1422, the sound data 262 may be sent to an orchestrator component 1430. The orchestrator component 1430 may include memory and logic that enables the orchestrator component 1430 to transmit various pieces and forms of data to various components of the system, as well as perform other operations as described herein.

The systems 1422 may include various components for processing natural language commands. A system 1422 may include a language processing component 1492 for performing operations related to understanding natural language such as ASR, NLU, entity resolution, etc. The system 1422 may include a language output component 1493 for performing operations related to generating a natural language output, such as TTS. The system 1422 may also include a component to track system state data 1495. Such system state data 1495 may indicate the state of operations of the respective system 1422 for example with respect to a particular device 103, user profile, or the like. For example, state data 1495 may include dialog data, indications of previous utterance(s), whether the system 1422 has any ongoing processes for the device 103/user profile, or the like. The system 1422 may include one or more skill components 1490. The skill components 1490 may perform various operations related to executing commands such as online shopping, streaming media, controlling smart-home appliances, and the like.

The system 1422 includes a language output component 1493. The language output component 1493 includes a natural language generation (NLG) component 1479 and a text-to-speech (TTS) component 1480. The NLG component 1479 can generate text for purposes of TTS output to a user. For example, the NLG component 1479 may generate text corresponding to instructions corresponding to a particular action for the user to perform. The NLG component 1479 may generate appropriate text for various outputs as described herein. The NLG component 1479 may include one or more trained models configured to output text appropriate for a particular input. The text output by the NLG component 1479 may become input for the TTS component 1480 (e.g., output text data 1413 discussed below). Alternatively, or in addition, the TTS component 1480 may receive text data from a skill 1490 or other system component for output.

The NLG component 1479 may include a trained model. The NLG component 1479 generates text data 1413 from dialog data received by a dialog manager such that the output text data 1413 has a natural feel and, in some embodiments, includes words and/or phrases specifically formatted for a requesting individual. The NLG may use templates to formulate responses. And/or the NLG system may include models trained from the various templates for forming the output text data 1413. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 1480.

The TTS component 1480 may generate audio data (e.g., synthesized speech) from text data using one or more different methods. Text data input to the TTS component 1480 may come from a skill component 1490, the orchestrator component 1430, or another component of the system. In one method of synthesis called unit selection, the TTS component 1480 matches text data against a database of recorded speech. The TTS component 1480 selects matching units of recorded speech and concatenates the units together to form audio data. In another method of synthesis called parametric synthesis, the TTS component 1480 varies parameters such as frequency, volume, and noise to create audio data including an artificial speech waveform. Parametric synthesis uses a computerized voice generator, sometimes called a vocoder. The TTS component 1480 may be capable of generating output audio representing natural language speech in one or more natural languages (e.g., English, Mandarin, French, etc.).

The system 1400 (either on device 103, system 1422, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 1410, the user profile (associated with the presented login information) may be updated to include information about the device 1410, for example with an indication that the device is currently in use. Each user profile may include identifiers of skills that the user has enabled. When a user enables a skill, the user may give the system 1422 permission to allow the skill to execute with respect to the user's natural language user inputs. If a user does not enable a skill, the system 1422 may not invoke the skill to execute with respect to the user's natural language user inputs.

The profile storage 1470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The profile storage 1470 may include data corresponding to state data 1495. For example, the profile storage 1470 may indicate the device process control capabilities of one or more devices associated with a particular user profile. Such state data 1495 may be updated by one or more device(s) as user(s) interact with the device(s) to maintain an updated record of the state of the device. Alternatively (or in addition) the profile storage 1470 may include, for a particular user profile, state data 1495 reflecting capability data indicating the device process control operations that may be performed by a device 1410.

The orchestrator component 1430 may send the sound data 262 to a language processing component 1492. The language processing component 1492 (sometimes also referred to as a spoken language understanding (SLU) component) includes an automatic speech recognition (ASR) component 1450 and a natural language understanding (NLU) component 1460. The ASR component 1450 may transcribe the sound data 262 into text data. The text data output by the ASR component 1450 represents one or more than one (e.g., in the form of an N-best list) ASR hypotheses representing speech represented in the sound data 262. The ASR component 1450 interprets the speech in the sound data 262 based on a similarity between the sound data 262 and pre-established language models. For example, the ASR component 1450 may compare the sound data 262 with models for sounds (e.g., acoustic units such as phonemes, phones, etc.) and sequences of sounds to identify words that match the sequence of sounds of the speech represented in the sound data 262. The ASR component 1450 sends the text data generated thereby to an NLU component 1460, via, in some embodiments, the orchestrator component 1430. The text data sent from the ASR component 1450 to the NLU component 1460 may include a single top-scoring ASR hypothesis or may include an N-best list including multiple top-scoring ASR hypotheses. An N-best list may additionally include a respective score associated with each ASR hypothesis represented therein.

The language processing system 1492 may further include a NLU component 1460. The NLU component 1460 may receive the text data from the ASR component 1450. The NLU component 1460 may attempt to make a semantic interpretation of the phrase(s) or statement(s) represented in the text data input therein by determining one or more meanings associated with the phrase(s) or statement(s) represented in the text data. The NLU component 1460 may determine an intent representing an action that a user desires be performed and may determine information that allows a device (e.g., the device 103, the system(s) 1422, a skill component 1490, skill processing component(s) 1425, etc.) to execute the intent. For example, if the text data corresponds to "play the 5th Symphony by Beethoven," the NLU component 460 may determine an intent that the system output music and may identify "Beethoven" as an artist/composer and "5th Symphony" as the piece of music to be played. For further example, if the text data corresponds to "what is the weather," the NLU component 1460 may determine an intent that the system output weather information associated with a geographic location of the device 103. In another example, if the text data corresponds to "turn off the lights," the NLU component 1460 may determine an intent that the system turn off lights associated with the device 103 or the user 5.

A skill component may be software running on the system(s) 1422 that is akin to a software application. That is, a skill component 1490 may enable the system(s) 1422 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 1422 may be configured with more than one skill component 1490. For example, a weather service skill component may enable the system(s) 1422 to provide weather information, a car service skill component may enable the system(s) 1422 to book a trip with respect to a taxi or ride sharing service, a restaurant skill component may enable the system(s) 1422 to order a pizza with respect to the restaurant's online ordering system, etc. A skill component 1490 may operate in conjunction between the system(s) 1422 and other devices, such as the device 103, in order to complete certain functions. Inputs to a skill component 1490 may come from speech processing interactions or through other interactions or input sources. A skill component 1490 may include hardware, software, firmware, or the like that may be dedicated to a particular skill component 1490 or shared among different skill components 1490.

Skill processing component(s) 1425 may communicate with a skill component(s) 1490 within the system(s) 1422 and/or directly with the orchestrator component 1430 or with other components. A skill processing component(s) 1425 may be configured to perform one or more actions. An ability to perform such action(s) may sometimes be referred to as a "skill." That is, a skill may enable a skill processing component(s) 1425 to execute specific functionality in order to provide data or perform some other action requested by a user. For example, a weather service skill may enable a skill processing component(s) 1425 to provide weather information to the system(s) 1422, a car service skill may enable a skill processing component(s) 1425 to book a trip with respect to a taxi or ride sharing service, an order pizza skill may enable a skill processing component(s) 1425 to order a pizza with respect to a restaurant's online ordering system, etc. Additional types of skills include home automation skills (e.g., skills that enable a user to control home devices such as lights, door locks, cameras, thermostats, etc.), entertainment device skills 1491 (e.g., skills that enable a user to control entertainment devices such as smart televisions), video skills, flash briefing skills, as well as custom skills that are not associated with any pre-configured type of skill.

The system(s) 1422 may be configured with a skill component 1490 dedicated to interacting with the skill processing component(s) 1425. Unless expressly stated otherwise, reference to a skill, skill device, or skill component may include a skill component 1490 operated by the system(s) 1422 and/or skill operated by the skill processing component(s) 1425. Moreover, the functionality described herein as a skill or skill may be referred to using many different terms, such as an action, bot, app, or the like. The skill 1490 and or skill processing component(s) 1425 may return output data to the orchestrator 1430.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems may recognize, retain, and use information collected during more than one input during a back-and-forth or "multi-turn" interaction with the user; for example, information regarding a language in which a dialog is being conducted.

Although the components of FIG. 9 may be illustrated as part of system(s) 1422, device 103, or otherwise, the components may be arranged in other device(s) (such as in device 103 if illustrated in system(s) 1422 or vice-versa, or in other device(s) altogether) without departing from the disclosure.

In accordance with one or more preferred implementations, an electronic detector device operating as a smoke or CO detector is further configured to operate as a router, e.g., a WiFi router. The electronic detector device may be configured for use with a management application A system for intuitive home networking may include one or more such electronic detector devices 104 operating as a router and a management application. The system may additionally include additional routers (which may or may not be detector devices) which, along with the electronic detector device, can be configured to create a mesh network. The system functions to provide a home networking solution that is easy and intuitive to access and manage.

Traditional home networking solutions are often based on old and user-unfriendly technologies. The majority of routers are used and configured in much the same way that they were in 2000, when the 802.11b standard was first introduced. The consequence of this is that though router speeds (both wireless and wired) have increased enormously, most home users are no more in control of their home network than they were fifteen years ago. One only needs to look at the proliferation of wireless networks with SSIDs like "ATT032" or "2WIRE231" to see this effect. In an era where the average person can deposit checks, video chat with friends thousands of miles away, watch movies, and shop for virtually anything without leaving their living room, they are unable to alter something as simple as a wireless network name.

There is an obvious inconvenience associated with not being able to change a wireless network SSID, but this issue is only the tip of an iceberg of problems caused by traditional home networking solutions. Many users are just as unable to change passwords associated with their routers, which is not only inconvenient (who wants to remember a password like 'A9DS8F7ADS9'?) but also insecure. More technologically savvy users may be able to access and alter these parameters, but even many power users find home networking management interfaces confusing and cumbersome to use, especially to manage any configuration more complex than a single router interfacing between a single WAN and single LAN.

This simple configuration is often inadequate to support wireless internet connectivity for devices throughout a household, leaving users tethered instead of liberated by wireless connectivity. The system serves to allow users to take charge of their home network by allowing intuitive configuration and use, increasing the security and quality of the home networking experience.

While the system is described throughout this application as being applicable to home networks, a person skilled in the art will recognize that such a system can be applied to any suitable computer network (such as one in a small business). The system is preferably intended for use in scenarios where enterprise networking solutions (and the support staff to maintain them) are not feasible; additionally or alternatively, the system may be used in any suitable scenario.

The detector device 104 or another router may serve as a base station for a home network. The detector device 104 preferably creates a home network (using either or both of wired and wireless network connections) and the detector device 104 or another router also serves as the gateway for the home network to the internet (or other WAN). Additionally or alternatively, the detector device 104 may perform other home networking functions; for example, the detector device 104 may serve as a wireless access point for an existing network.

In one embodiment, the system includes several routers (which each may be an electronic detector device) that communicate with each other (either over wired or wireless connections) to create a mesh network. Such a mesh network may be especially beneficial for enabling good wireless connectivity throughout a building.

The detector device 104 preferably includes a Wi-Fi radio, a Bluetooth radio, an Ethernet interface, and a processor, in addition to various other communication components as described elsewhere herein. The detector device 104 may additionally or alternatively include any other hardware or software. In one example implementation, a detector device 104 includes two Wi-Fi radios: one 5 GHz radio, and one switchable radio (that may operate at either 5 or 2.4 GHz), a Bluetooth radio capable of both Bluetooth 4.0 and BTLE communication, an auto-sensing gigabit Ethernet interface, an ARM processor, DDR RAM, EMMC storage (for router firmware), and a USB interface (e.g., for adding network-accessible storage).

The Wi-Fi radio functions to provide wireless access to the detector device 104. The Wi-Fi radio preferably serves to allow electronic devices (e.g., smartphones, laptops, gaming consoles) to communicate wirelessly with the detector device 104 and with each other through a LAN. Additionally or alternatively, the Wi-Fi radio may be used to communicate with another detector device 104, with a wireless WAN, or with any other device or wireless network.

The Wi-Fi radio preferably includes at least one antenna; additionally or alternatively, the Wi-Fi radio may include an interface to connect to an external antenna. Antennas may be of a variety of antenna types; for example, patch antennas (including rectangular and planar inverted F), reflector antennas, wire antennas (including dipole antennas), bow-tie antennas, aperture antennas, loop-inductor antennas, ceramic chip antennas, antenna arrays, and fractal antennas.

Configuration and control of the Wi-Fi radio is preferably performed by the processor, but may additionally or alternatively be performed by any suitable controller.

The Wi-Fi radio preferably supports communication over all of IEEE 802.11 a/b/g/n/ac standards, but may additionally or alternatively support communication according to any standard (or no standard at all).

The detector device 104 may include any number of Wi-Fi radios operating on any suitable frequency ranges. In one implementation, the detector device 104 includes two Wi-Fi radios: one operable on either of the 2.4 GHz band and the 5 GHz band (the radio may switch between the two), and another operable on only the 5 GHz band. This enables the detector device 104 to select from two different communication modes (2.4 GHz+5 GHz or 5 GHz+5 GHz) in order to maximize connection quality. In this implementation, the detector device 104 includes six Wi-Fi antennas: 2 for 2.4 GHz and 4 for 5 GHz (two for each Wi-Fi radio).

The Wi-Fi radios preferably operate using single-input/single-output (SISO) communication techniques, but may additionally or alternatively operate using multiple-input and/or multiple-output communication techniques (e.g., SIMO, MISO, MIMO). If the Wi-Fi radios operate using MIMO techniques, the Wi-Fi radios may use any type of MIMO techniques (e.g., precoding, spatial multiplexing, space-division multiple access, and/or diversity coding). Further, the Wi-Fi radios may perform MIMO communication either independently (e.g., a radio performs MIMO communication with multiple antennas coupled to that radio) or cooperatively (e.g., two separate radios perform MIMO communication together).

The Bluetooth radio functions to allow devices to communicate with the detector device 104 over a connection mechanism alternative to Wi-Fi. The Bluetooth radio is preferably used to allow the detector device 104 to be configured for the first time by a smartphone (or other Bluetooth-enabled computing device). The Bluetooth radio may additionally or alternatively be used for any other purpose; for example, for configuring the detector device 104 at a different time, for communication between routers, or for communication with smart devices in a home (e.g., smart locks, light bulbs).

The Bluetooth radio preferably supports the Bluetooth 4.0 standard, including communications capabilities for classic Bluetooth as well as Bluetooth Low-Energy (BTLE). The Bluetooth radio preferably switches between classic Bluetooth and Bluetooth Low-Energy, but may additionally or alternatively be capable of communicating over both simultaneously.

The Bluetooth radio preferably includes at least one antenna; additionally or alternatively, the Bluetooth radio may include an interface to connect to an external antenna. Antennas may be of a variety of antenna types; for example, patch antennas (including rectangular and planar inverted F), reflector antennas, wire antennas (including dipole antennas), bow-tie antennas, aperture antennas, loop-inductor antennas, ceramic chip antennas, antenna arrays, and fractal antennas.

The Ethernet interface functions to provide wired connectivity to the detector device 104. The Ethernet interface preferably allows wired devices to connect to the detector device 104. In many cases, the detector device 104 may be connected to the internet through the Ethernet interface; for example, the Ethernet interface may be used to connect a cable or DSL modem to the detector device 104.

The Ethernet interface preferably includes a plurality of Ethernet ports. Ports of the Ethernet interface are preferably capable of 1000BASE-T (i.e., gigabit) communication, but may additionally or alternatively be capable of communication at any rate. The Ethernet interface preferably automatically sets the communication rate based on the capabilities of connected devices, but may additionally or alternatively set the communication rate manually.

Ports of the Ethernet interface preferably auto-detect whether a given connection is a WAN connection or a LAN connection. Auto-detecting ports remove a frequent problem in home networking; since users can plug a WAN connection into any port of the Ethernet interface, the opportunity for users to mistakenly connect a WAN connection to a LAN designated port (or vice versa) does not exist.

The Ethernet interface preferably performs autodetection by querying the connected device or network, and determining whether the connection is a WAN or LAN connection auto detection response. For example, the Ethernet interface may broadcast an ICMP Address Mask Request; an end node (e.g., a personal computer connected to the detector device 104) will most likely not respond to this request, while an ISP router (indicative of a WAN connection) may respond to the request. Therefore, if the Ethernet interface receives a response to the ICMP Address Mask Request, it may mark that port as a WAN port; if not, it may mark the port as a LAN port.

The Ethernet interface may additionally or alternatively perform auto detection in any suitable way (e.g., waiting to receive requests over the port and analyzing them, etc.).

In addition to the Ethernet interface, the detector device 104 may additionally or alternatively perform wired communication over any wired interface. For example, the detector device 104 may perform communication through a powerline interface (e.g., Ethernet over Power).

The processor functions to control the components of the detector device 104 (e.g., the radios and, the Ethernet interface, etc.). The processor is preferably an ARM processor, but may additionally or alternatively be any suitable processor or microcontroller.

The processor functions to process data transmitted or received by the detector device 104; data processed by the processor may originate from either the Wi-Fi radio, the Bluetooth radio, the Ethernet interface, or from any other suitable source. The processor preferably processes data according to instructions in firmware, but may additionally or alternatively process data according to any other suitable instructions.

The processor firmware and/or other detector device 104 firmware are preferably flash-able over the air (OTA), allowing updates to reach the detector device 104 without manual or individual configuration.

The processor preferably also performs power management for the detector device 104. For example, the processor may put components of the detector device 104 into a sleep mode after a period of inactivity.

The detector device 104 may additionally or alternatively include any other hardware. For example, the detector device 104 may include a USB interface (for connection of network-attached storage, a DLNA server, etc. or for configuration purposes). In one embodiment, the detector device 104 includes a hardware encryption module (HEM). The HEM is preferably a chip that stores an encryption key securely (e.g., the Atmel SHA204) and performs data encryption based on that key but may additionally or alternatively be any hardware module capable of encrypting transmissions from and/or decrypting transmissions to the detector device 104.

The detector device 104 preferably stores firmware and/or software on an embedded MultiMediaCard (eMMC), but may additionally or alternatively store firmware and/or software in any suitable storage solution.

The detector device 104 preferably operates as a Linux server running Python programs, but may additionally or alternatively operate using any software and/or firmware.

The detector device 104 is preferably configured using the management application operating on a remote electronic device (e.g., a user's smartphone), but may additionally or alternatively be configured by any suitable manner (e.g., by a web interface).

Parameters of the detector device 104 that may be user-configured may include any suitable networking (or other parameters); for example, router name, router administrative password, router WAN settings (e.g., connection type, IP address, etc.), router Ethernet settings, router wireless settings (e.g., SSID, password, channel, connection mode), DHCP server settings, port forwarding, NAS settings, and DLNA server settings.

Detector device 104 software preferably enables the detector device 104 to automatically configure some configuration parameters; for example, the detector device 104 may automatically set wireless channels based on other detected wireless networks. As another example, a detector device 104 may detect another detector device 104 on a local area network and automatically configure itself as an access point for that LAN.

The management application functions to manage routers that are part of a home network. The management application is preferably a native application running on a smartphone (e.g., an iOS or Android application), but may additionally or alternatively be any suitable application (e.g., a web app, a desktop app, etc.).

The management application preferably aids in first-time configuration of the detector device 104, as well as management and configuration of the detector device 104 after initial setup. The management application preferably includes a graphical user interface for monitoring and/or configuration.

The management application preferably allows for control of any user-configurable parameters of the detector device 104 but may additionally or alternatively allow for control of only a subset of user-configurable parameters of the detector device 104. The management application preferably also allows for network monitoring (e.g., active connections, bandwidth usage, uptime, etc.).

The management application preferably configures the detector device 104 through an intermediary server (e.g., a remote router management platform). The management application may first send a new configuration through the internet (either through the internet connection of the detector device 104 or through an alternative connection; e.g., cellphone LTE) to a remote server. Once the configuration is authenticated, it can then be sent back through the internet to the detector device 104. The remote server preferably stores the configuration file of the detector device 104 (allowing it to be re-downloaded at any time if necessary).

Additionally or alternatively, the management application may configure the router directly (e.g., through Wi-Fi, Bluetooth, USB, etc.).

The detector device 104 preferably performs initial configuration according to a process designed to reduce complexity while still providing users with a highly satisfactory networking solution.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

The invention claimed is:

1. A method comprising:

determining a first activity type for a first activity in a first activity queue associated with a first network, determining a first priority level for the first activity, determining, based on the first activity type and the first priority level, a first priority value, determining a second activity type for a second activity in a second activity queue associated with a second network, determining a second priority level for the second activity, determining, based on the second activity type and the second priority level, a second priority value, and selecting, based on the second priority level, the second activity for performance.

2. The method of claim 1, further comprising:

determining a third activity queue that includes both the first activity and the second activity, the second activity being higher in the third queue than the first activity based on the second priority value and the first priority value, and wherein the selecting is based on the third activity queue.

3. The method of claim 1, further comprising:

determining a third activity queue that includes both the first activity and the second activity, the second activity being higher in the third queue than the first activity based on the second priority value and the first priority value, and determining that the second priority value is a highest priority value among activities in the third activity queue, wherein the selecting is based on the determining that the second priority value is the highest priority value among activities in the third activity queue.

4. The method of claim 1, further comprising:

determining a third activity queue that includes both the first activity and the second activity, the second activity being higher in the third queue than the first activity based on the second priority value and the first priority value, and sorting the third activity queue by priority value, wherein the selecting is based on the third activity queue.

5. The method of claim 1, further comprising:

selecting, based on the first priority level, the first activity for performance, and transmitting, based on the selecting of the first activity, a second signal using a second modulation scheme associated with the first network.

6. The method of claim 1, wherein the first network is associated with a second modulation scheme.

7. The method of claim 1, further comprising:

generating, based on a plurality of microphones, first speech data representing user speech, determining that the first speech data corresponds to a first wakeword, based on the determining that the first speech data corresponds to a first wakeword, sending second speech data to a remote system, receiving, from the remote system, third data; and outputting, based on the third data and using a speaker, an audio response to the user speech.

8. The method of claim 7 further comprising:

determining, based on a smoke detection sensor, an alarm event, and sending, based on the alarm event and using a sub-GHz wireless communication component, alarm data.

9. The method of claim 8, wherein the second speech data is the same as the first speech data.

10. The method of claim 8, wherein the second speech data is a subset of the first speech data.

11. The method of claim 8, wherein the second speech data is generated based on the first speech data.

12. The method of claim 8, further comprising:

generating, based on the plurality of microphones, fourth speech data representing second user speech, determining that the fourth speech data corresponds to the first wakeword, based on the determining that the fourth speech data corresponds to the first wakeword, sending fifth speech data to the remote system using the sub-GHz wireless communication component, receiving, from the remote system using the sub-GHz wireless communication component, sixth data;

outputting, based on the sixth data and using the speaker, an audio response to the user speech.

13. A method comprising:

determining, by a device, a first communication activity and a second communication activity performed using a wireless transceiver;

determining, by the device, priority information associated with the first communication activity and the second communication activity;

determining, by the device and based on the priority information, a first priority level for the first communication activity and a second priority level for the second communication activity;

determining, based on the first priority level and the second priority level that the first priority level is higher than the second priority level; and establishing, by the device with a second device, a communication session using a first communication protocol associated with the first communication activity.

14. The method of claim 13, wherein each of the first communication activity and the second communication activity is associated with multiple communication protocols.

15. The method of claim 13, wherein determining the priority information comprises retrieving the priority information from a global priority table, wherein the global priority table includes association information between a communication activity type, a communication protocol, and a priority level.

16. The method of claim 13, wherein determining the first priority level further comprises:

determining that the first communication protocol is associated with the first communication activity; and determining that the first communication activity is of a first type.

17. A method comprising:

determining a first communication activity and a second communication activity, wherein the first communication activity and the second communication activity are performed over a first channel;

determining that the first communication activity has a first priority that is higher priority than a second priority of the second communication activity;

determining that both the first communication activity and the second communication activity are scheduled to occur during first time period;

delaying the second communication activity to a second time period later than the first time period; and performing the first communication activity during the first time period.

18. The method of claim 17, further comprising:

determining that a third communication activity is scheduled to occur in a third time period after the first time period;

determining that the third communication activity has a third priority that is lower than the first priority; and performing the third communication activity during the third time period.

19. The method of claim 17, further comprising:

determining that the second communication activity is preempted a predetermined number of times; and changing the second priority to be higher than the first priority for subsequent communications.

20. The method of claim 19, wherein changing the second priority is based on a clock drift of a device that is configured to receive data during the second communication activity.

* * * * *